United States Patent
Yamazaki et al.

(10) Patent No.: US 7,965,611 B2
(45) Date of Patent: Jun. 21, 2011

(54) OPTICAL DISK APPARATUS AND STARTING METHOD THEREOF

(75) Inventors: Shigeki Yamazaki, Matsudo (JP); Motoyuki Suzuki, Yokohama (JP); Toshio Saitoh, Matsudo (JP); Jinya Ikeda, Nishiibaraki (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 915 days.

(21) Appl. No.: 11/412,103

(22) Filed: Apr. 27, 2006

(65) Prior Publication Data
US 2007/0203913 A1    Aug. 30, 2007

(30) Foreign Application Priority Data
Sep. 27, 2005   (JP) ................... 2005-279273

(51) Int. Cl.
*G11B 7/135* (2006.01)
(52) U.S. Cl. .......... 369/112.13; 369/112.08; 369/112.26
(58) Field of Classification Search .............. 369/30.36, 369/13.2, 13.21, 30.32, 44.28
See application file for complete search history.

(56) References Cited

U.S. PATENT DOCUMENTS

| | | | |
|---|---|---|---|
| 6,756,574 B2 * | 6/2004 | Higuchi ................ | 250/201.2 |
| 2003/0174617 A1 * | 9/2003 | Kim et al. .............. | 369/53.22 |
| 2003/0179676 A1 * | 9/2003 | Ito ....................... | 369/53.22 |
| 2005/0068881 A1 * | 3/2005 | Kimura et al. .......... | 369/112.23 |

FOREIGN PATENT DOCUMENTS

| | | | |
|---|---|---|---|
| JP | 2005-100481 | * | 4/2005 |
| JP | 2005-100481 A | | 4/2005 |

* cited by examiner

*Primary Examiner* — Hoa T Nguyen
*Assistant Examiner* — Andrew J Sasinowski
(74) *Attorney, Agent, or Firm* — McDermott Will & Emery LLP

(57) ABSTRACT

In a three-wavelength-compliant optical disk apparatus, the present invention enables to shorten time required for starting the apparatus such as discrimination of an optical disk and adjustment of a beam-expander. At the time of starting the apparatus, the operation of a tray driver which pulls a loaded optical disk within the apparatus is conducted in parallel with the operation of a beam-expander driver which allows a movable lens of the beam-expander to move to a predetermined position in accordance with the kind of optical disk. Further, at the time of discriminating the disk, the number of times an optical disk of a specific kind has continuously been loaded into the apparatus to date is stored in a memory, and a sequence of discriminating the kind of optical disk that is newly discriminated is switched by referring to the history information.

10 Claims, 12 Drawing Sheets

OPTICAL DISK APPARATUS AND STARTING METHOD THEREOF

CLAIM OF PRIORITY

The present application claims priority from Japanese application serial no. JP 2005-279273, filed on Sep. 27, 2005, the content of which is hereby incorporated by reference into this application.

BACKGROUND OF THE INVENTION

1. Field of the Invention

The present invention relates to an optical disk apparatus capable of loading a plurality of kinds of optical disks, and a starting method thereof.

2. Description of the Related Art

In addition to conventional optical disks such as CDs and DVDs, BDs (Blu-ray Disks) with more high-density and high-capacity are beginning to come into practical use. For the purpose of loading a plurality of kinds of optical disks, an optical disk apparatus discriminates the kind of optical disk and optimally switches operational conditions of the apparatus in accordance with the discriminated kind of disk.

In order to comply with BD, DVD, and CD disks, the optical disk apparatus includes a three-wavelength optical pickup as an optical system which generates laser light with wavelengths of 405 nm, 660 nm and 780 nm, respectively, and positions the focus of the light beam from an objective lens to a recording surface of each disk. Further, the optical disk apparatus is newly provided with a beam-expander composed of a fixed lens and a movable lens for BD disks in order to correct spherical aberration caused by a disk-plate-thickness error (For example, refer to Japanese Patent Laid-open No. 2005-100481).

SUMMARY OF THE INVENTION

A three-wavelength-compliant optical disk apparatus having a three-wavelength optical pickup mounted operates as follows. FIG. 2 shows a configuration example of the above-described beam-expander 23 which is composed of the fixed lens 22a and the movable lens 22b. The movable lens 22b is moved to a predetermined position in accordance with the kind of disk to correct spherical aberration.

FIG. 3 shows a pattern diagram of positions of recording surfaces of the respective optical disks. The positions of the recording surfaces differ depending on the kinds of disks. The laser beam from the objective lens 9 is adjusted so that the focus is positioned to the recording surface of each disk.

FIG. 4 shows an example of moving positions of the movable lens 22b of the beam-expander. The movable lens 22b enables its minute drive of, for example, 10 μm/step by using a stepping motor to correct spherical aberration of the disk. Therefore, it takes a lot of time to move the movable lens 22b to the corresponding position of each disk.

As described above, when starting the three-wavelength-compliant optical disk apparatus having the three-wavelength optical pickup mounted, it is necessary to discriminate which kind of optical disk the loaded optical disk is, and further to adjust the position of the movable lens of the beam-expander. As a result, a problem arises in that it takes a lot of time to start the apparatus as compared with a conventional two-wavelength-compliant optical disk apparatus.

The object of the present invention is to shorten the time required for starting the apparatus such as discrimination of the optical disk and adjustment of the beam-expander in the three-wavelength-compliant optical disk apparatus.

An optical disk apparatus according to the present invention is capable of loading a plurality of kinds of optical disks, and includes a beam-expander for adjusting the focus of a laser beam applied on the optical disk. The apparatus includes a tray driver which pulls the loaded optical disk within the apparatus, a beam-expander driver which allows a movable lens of the beam-expander to move to a predetermined position in accordance with the kind of optical disk, and a controller which controls the tray driver and the beam-expander driver. When the tray driver pulls the optical disk, the controller allows the beam-expander driver to move the movable lens in parallel with the pulling operation.

The optical disk apparatus according to the present invention is capable of loading a plurality of kinds of optical disks, and includes a signal processor which processes a signal detected from the loaded optical disk, a disk-discriminator which discriminates the kind of optical disk based on an output signal from the signal processor, and a storing unit which stores history information indicating a frequency of the kind of optical disk that was loaded into the apparatus in the past. When the kind of newly-loaded optical disk is discriminated, the disk-discriminator switches a sequence of discriminating the kind of optical disk by referring to the history information stored in the storing unit. In a preferred mode, the history information stored in the storing unit includes the number of times an optical disk of a specific kind has continuously been loaded to date, and the disk-discriminator performs discrimination starting from the optical disk of the specific kind when the number of times of loading exceeds the specific number of times.

In an optical disk apparatus into which a plurality of kinds of optical disks can be loaded and which includes a beam-expander for adjusting the focus of a laser beam applied on the optical disk, a method of starting the apparatus according to the present invention includes the steps of pulling the loaded optical disk within the apparatus, and moving a movable lens of the beam-expander to a predetermined position in accordance with the kind of optical disk, and the two steps are performed in parallel.

Further, the method of starting an optical disk apparatus according to the present invention includes the step of discriminating the kind of loaded optical disk. History information indicating a frequency of the kind of optical disk that was loaded into the apparatus in the past is stored. When the kind of newly-loaded optical disk is discriminated, a sequence of discriminating the kind of optical disk is switched by referring to the history information, and at the same time, the movable lens of the beam-expander is moved in accordance with the kind of optical disk which is discriminated first.

According to the present invention, there can be provided an optical disk apparatus which discriminates the kind of loaded optical disk, shortens the starting time for adjusting the beam-expander, and is excellent in user-friendliness, and a starting method thereof.

BRIEF DESCRIPTION OF THE DRAWINGS

These and other features, objects and advantages of the present invention will become more apparent from the following description when taken in conjunction with the accompanying drawings.

DETAILED DESCRIPTION OF THE PREFERRED EMBODIMENT

Hereinafter, embodiments of the present invention will be described on the basis of the drawings.

First Embodiment

Figure 1:
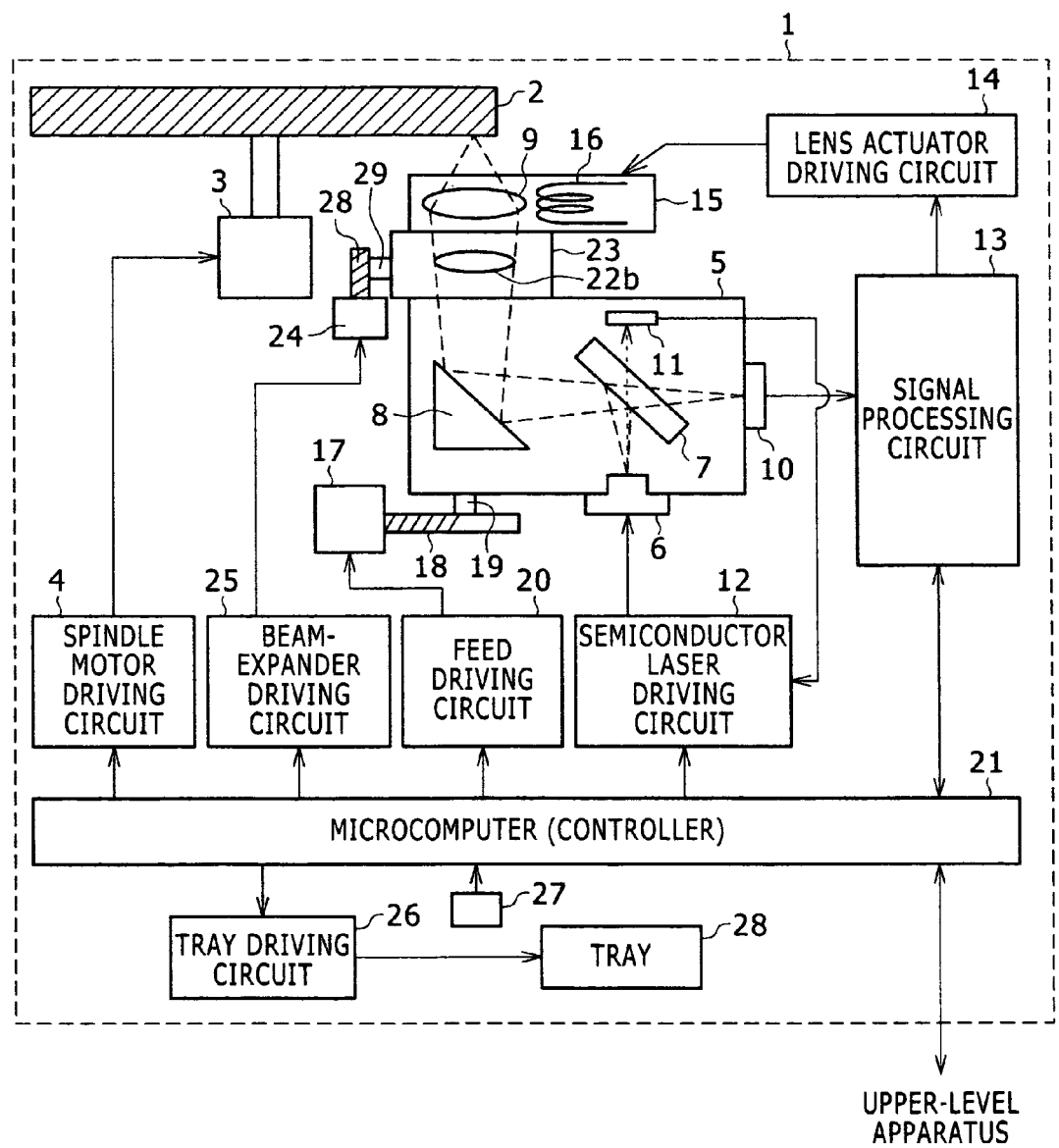
FIG. 1 is a block configuration diagram showing an embodiment of an optical disk apparatus according to the present invention.

FIG. 1 is a block configuration diagram showing an embodiment of an optical disk apparatus according to the present invention. A three-wavelength-compliant optical disk apparatus 1 is shown inside a dotted frame, and an optical disk 2 is loaded therein. A spindle motor 3 allows the optical disk 2 to rotate with a driving power supplied from a spindle motor driving circuit 4. A semiconductor laser light source 6 can emit laser beams with three wavelengths in an optical pickup 5. The emitted laser beam is reflected by a half mirror 7 and a mirror 8, and is converged into a minute light spot by an objective lens (focus lens) 9 so as to be applied on the optical disk 2. At this time, a monitor detector 11 detects the intensity of the laser beam to be applied and a semiconductor laser driving circuit 12 controls such that the intensity of the laser beam to be applied becomes constant.

The laser beam reflected by the optical disk 2 is converged by the objective lens 9 again, and is reflected by the mirror 8 to reach a quad detector 10 by transmitting the half mirror 7. The half mirror 7 is formed by depositing a reflective film with a reflectivity of 50% on a thick glass plate, and is arranged while being inclined by about 45 degrees with respect to the optical axis. Accordingly, the laser beam reaching the quad detector 10 is made to be astigmatic. Light receiving areas of the quad detector 10 are divided into four light receiving elements, and the quad detector 10 outputs a signal in accordance with the light intensity of the laser beam received by each light receiving element.

A signal processing circuit 13 receives the output signal from the quad detector 10, and generates a focus error signal (FE), a total sum signal (PE), a tracking error signal (TE), and an information reproducing signal. These signals are utilized for discrimination of a disk, and will be described later. A lens actuator driving circuit 14 amplifies the FE signal and the TE signal output from the signal processing circuit 13 to supply them to a coil 16 within a lens actuator 15. The coil 16 adjusts the position of the objective lens 9 in the optical axis direction (focus direction) and in the disk-radius direction (tracking direction).

Figure 2:
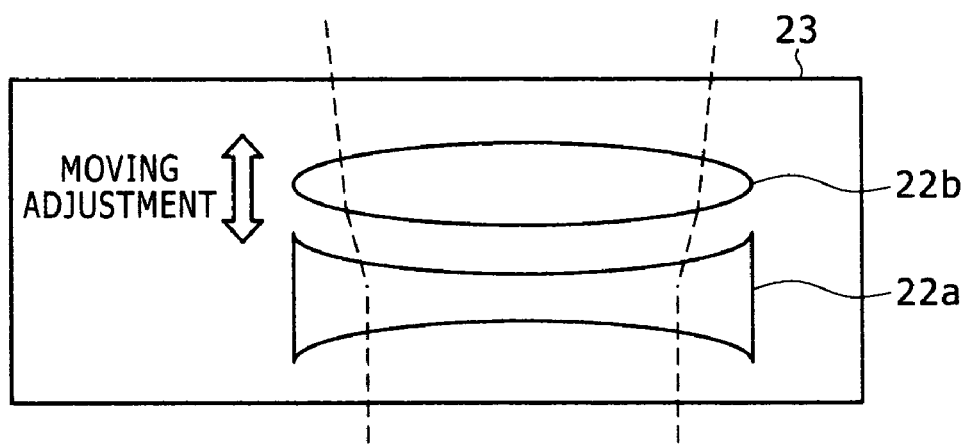
FIG. 2 is a diagram showing a configuration of a beam-expander in the optical disk apparatus.

In the apparatus of the embodiment, the optical pickup further includes a beam-expander 23. FIG. 2 shows a configuration of the beam-expander. For recording/reproducing of a BD disk, laser light with a wavelength of 405 nm and the objective lens 9 with a numeric aperture of 0.85 are used. However, the tolerance against out-of-focus is tight as compared with a DVD disk and the like. Therefore, separately from the objective lens 9, there is provided the beam-expander 23 that is formed by combining a fixed lens 22a and a movable lens 22b. The movable lens 22b is moved and adjusted so that the laser beam can be focused on a recording surface of the BD disk with a high degree of accuracy.

Figure 3:
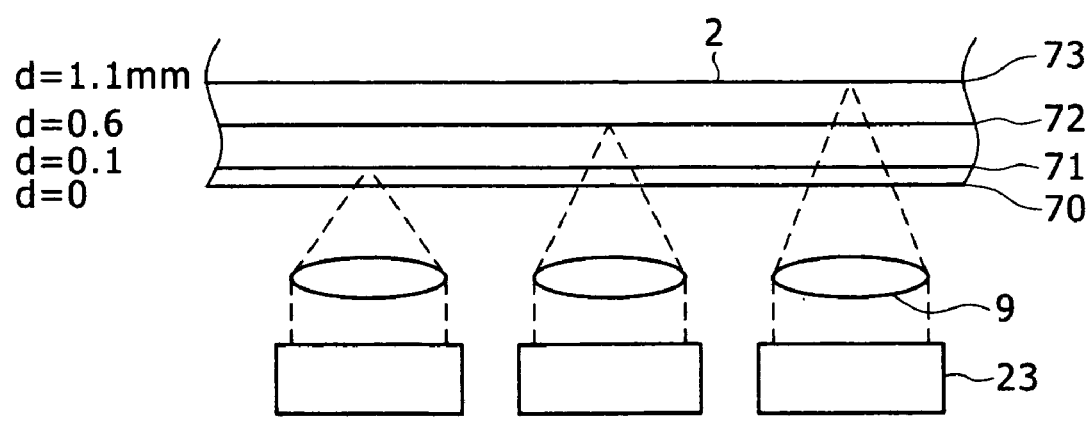
FIG. 3 is a diagram showing positions of recording surfaces in respective optical disks.

FIG. 3 shows positions of recording surfaces of respective optical disks. A recording surface 71 of the BD disk is positioned apart from a disk surface 70 by d=about 0.1 mm, a recording surface 72 of the DVD disk is positioned apart from the disk surface 70 by d=about 0.6 mm, and a recording surface 73 of the CD disk is positioned apart from the disk surface 70 by d=about 1.2 mm. The movable lens 22b of the beam-expander 23 is moved with respect to the respective disks so that the focus of the laser beam can be positioned on the respective recording surfaces of the disks. For the BD disk, the movable lens is further adjusted slightly to correct spherical aberration caused by a disk-thickness error.

Figure 4:
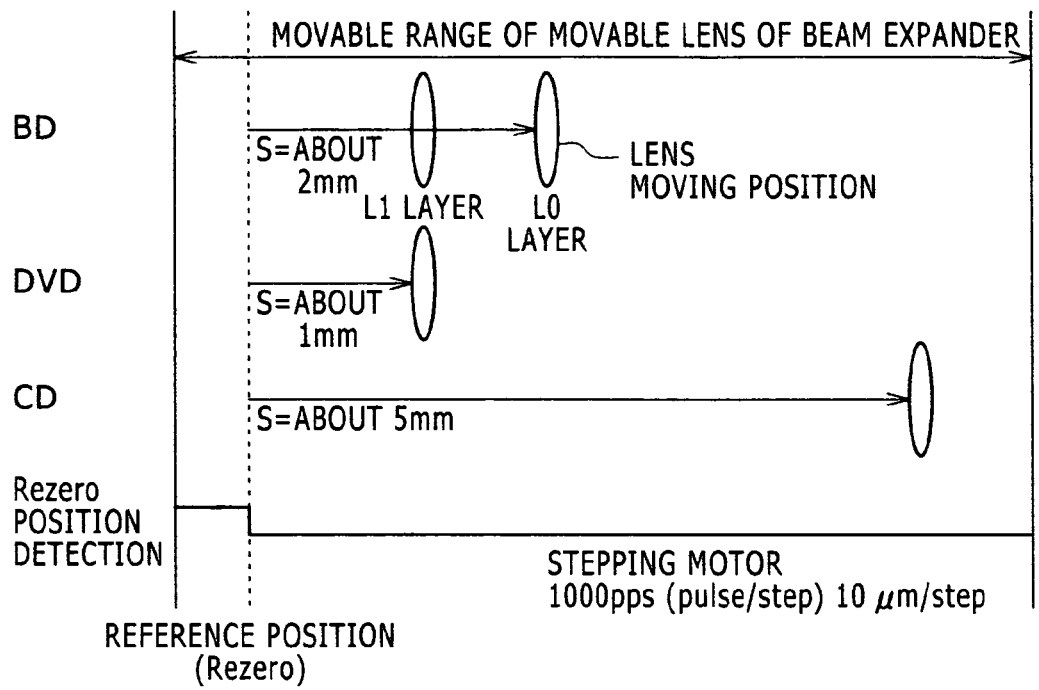
FIG. 4 is a diagram showing an example of moving positions of a movable lens with respect to the respective optical disks.

FIG. 4 shows an example of moving positions of the movable lens 22b with respect to the respective optical disks. With respect to an L1 layer of the BD disk and the recording surface of the DVD disk, the movable lens 22b is positioned apart from a preliminarily set reference position (Rezero) by s=about 1 mm, respectively. With respect to an L0 layer of the BD disk, the movable lens 22b is positioned apart from Rezero by s=about 2 mm. With respect to the recording surface of the CD disk, the movable lens 22b is positioned apart from Rezero by s=about 5 mm. Accordingly, the movable lens 22b is moved to these positions in accordance with the kind of disk when starting the apparatus. In the moving mechanism of the movable lens 22b of the beam-expander 23, a shaft 28 having a spiral groove formed is attached to a beam-expander stepping motor 24, and a pin 29 fixed to the beam-expander 23 (movable lens 22b) is inserted into the groove of the shaft 28. A microcomputer 21 controls a beam-expander driving circuit 25 to drive the stepping motor 24. The motor 24 has a high resolution of, for example, 10 μm/step (driving frequency 1000 pps (pulse/step)), and realizes a given amount of movement with the number of driving pulses. The reference position (Rezero) serving as a base point for movement is detected by providing a position sensor (not shown).

Figure 5:
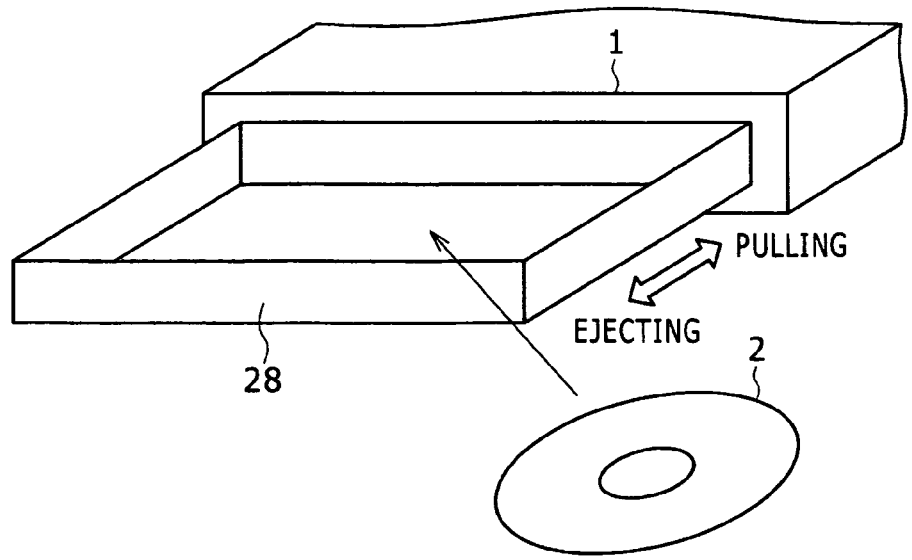
FIG. 5 is a perspective view of a tray for inserting/ejecting an optical disk.

In the feed mechanism of the optical pickup 5, a shaft 18 having a spiral groove formed is attached to a stepping motor 17, and a pin 19 fixed to the optical pickup 5 is inserted into the groove of the shaft 18. The shaft 18 attached to the stepping motor 17 is rotated by the microcomputer 21 and a feed driving circuit 20 to move the whole optical pickup 5 in the disk-radius direction. FIG. 5 is a perspective view of a tray 28 for use in inserting/ejecting the optical disk 2 into/from the apparatus. The optical disk 2 is placed on the tray 28, pulled within the apparatus, and then ejected from the apparatus. At this time, a tray sensor 27 detects the current position of the tray 28. The microcomputer 21 controls a tray driving circuit 26 to move the tray 28 to a given position.

The optical disk apparatus according to the embodiment is characterized in that the adjustment of the beam-expander 23 and the tray pulling operation are performed in parallel. Therefore, the microcomputer (controller) 21 controls such that the operation of the beam-expander driving circuit 25 meets that of the tray driving circuit 26 in timing. The adjustment of the beam-expander 23 (movement of the movable lens) is performed in a minute driving method by the stepping motor 24, and therefore it has originally been difficult to shorten the time of adjustment. Accordingly, the tray pulling operation and the beam-expander operation are performed in parallel so that the time required to start the apparatus can be shortened.

Figure 6:
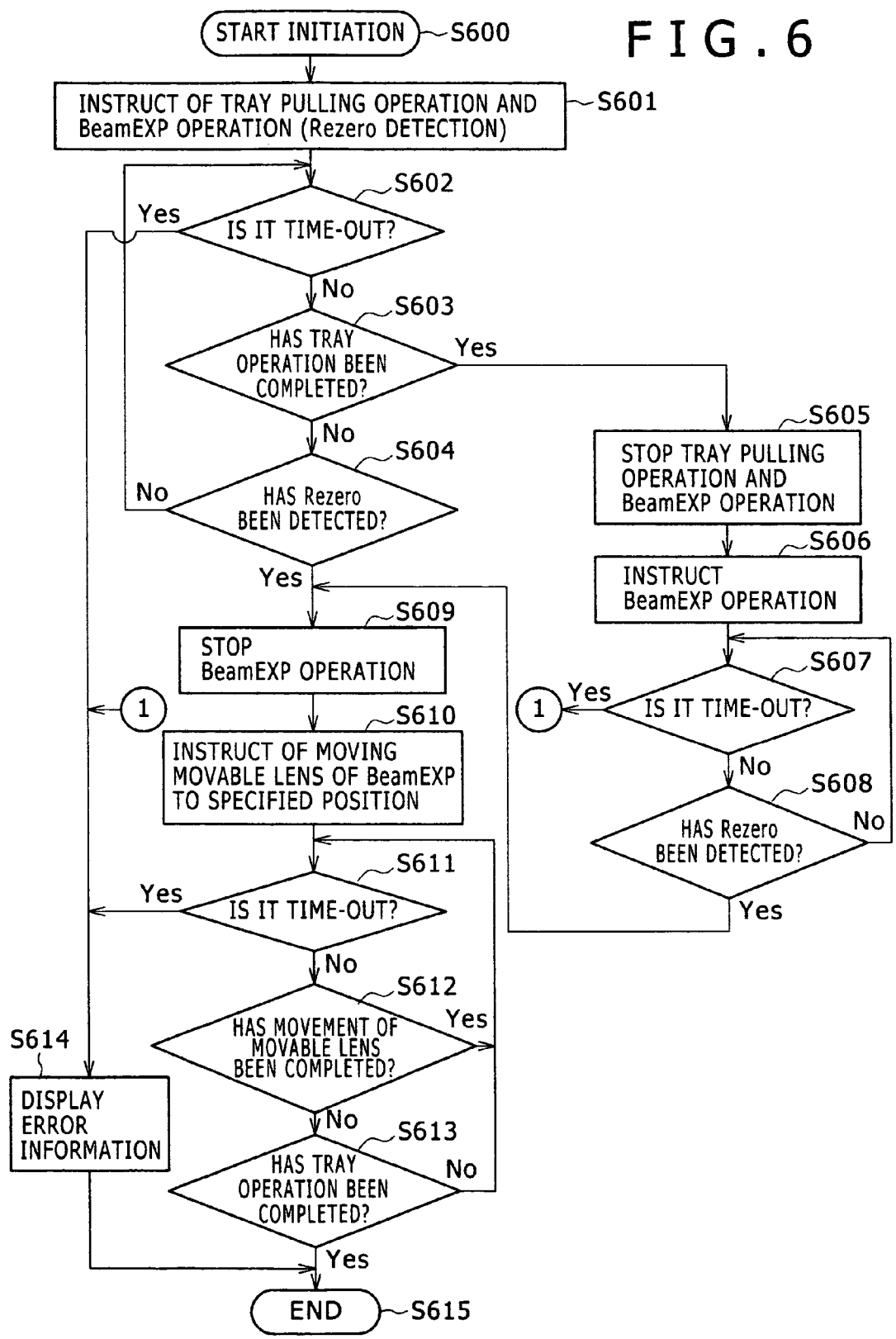
FIG. 6 is a flowchart showing an embodiment of a starting method of the optical disk apparatus according to the present invention.

FIG. 6 is a flowchart showing an embodiment of a starting method of the optical disk apparatus according to the present invention. In the embodiment, the tray pulling operation and the beam-expander operation are performed in parallel. The operations of the beam-expander include the operation of detecting the reference position (Rezero) and the operation of moving the movable lens to a specified position located apart from the reference position by the distance that is preliminarily set in accordance with the kind of disk. In order to conduct the beam-expander operation, the kind of disk must be given as a condition. If the kind of disk is preliminarily identified, the beam-expander operation may be conducted in accordance with the kind of disk. However, if the kind of disk is not preliminarily identified, the kind of disk is given in accordance with a discrimination sequence used when performing a disk discrimination process. In a typical case, the discrimination for a BD disk having a shallow depth of a recording layer is performed first.

If an optical disk is placed on the tray and a start initiating command is received (S600), the microcomputer 21 issues an instruction of the operation of detecting the reference position (Rezero detection) for the beam-expander (BeamEXP) as well as the tray pulling operation (S601). After a given time elapses, if it is not a time-out ("No" route from S602), the tray sensor 27 determines whether or not the tray operation has been completed (S603). If the tray operation has not been completed ("No" route from S603), it is determined whether or not the Rezero detection has been completed (S604). If neither of the operations has been completed, the flow returns to S602 to repeat the determination.

If the tray operation has been completed first ("Yes" route from S603), the tray pulling operation and the BeamEXP operation are stopped (S605). Then, only the BeamEXP operation (Rezero detection) is resumed (S606). If it is not a time-out ("No" route from S607), the determination on whether or not the Rezero detection has been completed is repeated (S608). If the Rezero detection has been completed, the flow proceeds to S609 to stop the BeamEXP operation.

On the other hand, the Rezero detection has been completed before the tray operation ("Yes" route from S604), the flow proceeds to S609 to stop the BeamEXP operation. Next, the movable lens of the BeamEXP is moved to the specified position in accordance with the kind of disk (S610). If it is not a time-out ("No" route from S611), the determination on whether or not the movement of the movable lens has been completed is repeated (S612). If the movement of the movable lens has been completed, the determination on whether or not the tray operation has been completed is repeated (S613). If the tray operation is completed, the flow ends (S615).

If it is a time-out in the respective steps (S602, S607, and S611), error information of the effect that the starting operation is not completed within a given time is displayed (S614).

According to the starting method of the embodiment, the tray pulling operation and the adjustment of the movable lens of the beam-expander are performed in parallel, so that there is an advantage that the time required to start the apparatus can be considerably shortened as compared with a method of independently conducting each operation.

Figure 7:
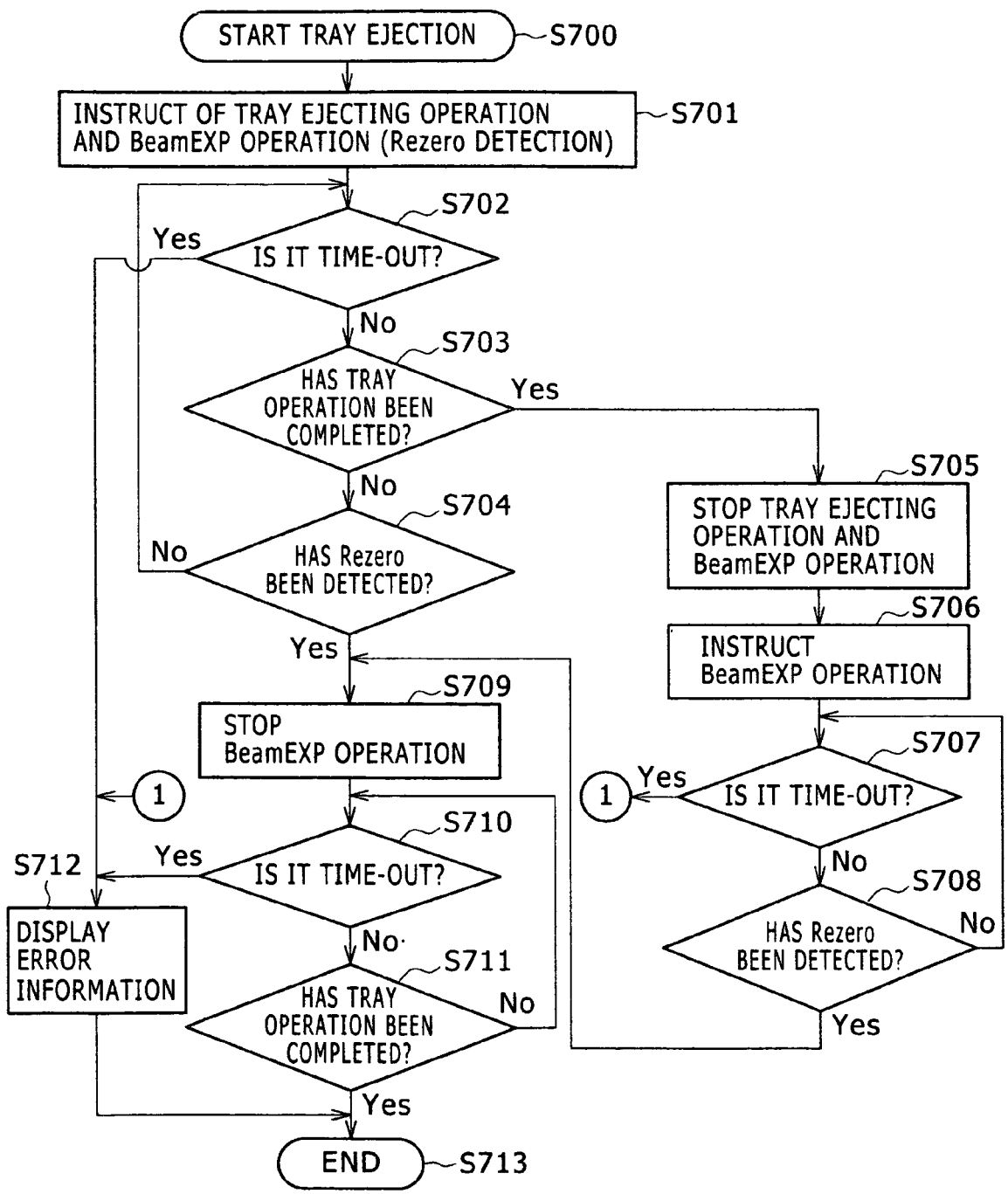
FIG. 7 is a flowchart showing another embodiment of the starting method of the optical disk apparatus according to the present invention.

Next, FIG. 7 is a flowchart showing another embodiment of the starting method of the optical disk apparatus, which can be further added to the embodiment of FIG. 6. In this embodiment, the tray ejecting operation and a part (Rezero detection) of the beam-expander operation are performed in parallel. Here, the operation of the Rezero detection is the operation in which the movable lens is returned to the reference position (Rezero) for standby after completion of recording/reproducing. However, the accuracy of the position is not necessarily required at the time of the operation because the operation of the Rezero detection, which is described with reference to FIG. 6, is conducted once again when starting the apparatus, and the positioning of the movable lens is performed with a high degree of accuracy. Therefore, it is sufficient in this case as long as the movable lens is moved in the vicinity of Rezero.

If a recording/reproducing operation is completed and an initiating command of the tray ejecting operation is received (S700), the microcomputer 21 issues an instruction of the Rezero detection of the BeamEXP as well as the tray ejecting operation (S701). If it is not a time-out ("No" route from S702), it is determined whether or not the tray operation has been completed (S703). If the tray operation has not been completed, it is determined whether or not the Rezero detection has been completed (S704). If neither of the operations has been completed, the flow returns to S702 to repeat the determination.

If the tray operation has been completed first ("Yes" route from S703), the tray ejecting operation and the BeamEXP operation are stopped (S705). Then, only the BeamEXP operation (Rezero detection) is resumed (S706). If it is not a time-out ("No" route from S707), the determination on whether or not the Rezero detection has been completed is repeated (S708). If the Rezero detection has been completed, the flow proceeds to S709 to stop the BeamEXP operation (S710). If it is not a time-out ("No" route from S710), the determination on whether or not the tray operation has been completed is repeated (S711). If the tray operation is completed, the flow ends (S713).

On the other hand, when the Rezero detection has been completed before the tray operation ("Yes" route from S704), the flow proceeds to S709 to perform the same steps as described above. If it is a time-out in the respective steps (S702, S707, and S710), error information is displayed as needed (S712).

According to the embodiment, a part of the operation of adjusting the movable lens of the beam-expander (in which the movable lens is returned in the vicinity of Rezero for standby), which is supposed to be performed when staring the apparatus, is conducted in parallel with the tray ejecting operation, so that the steps required when starting the apparatus next time can be eliminated and the time required to start the apparatus can be shortened.

Second Embodiment

Figure 8:
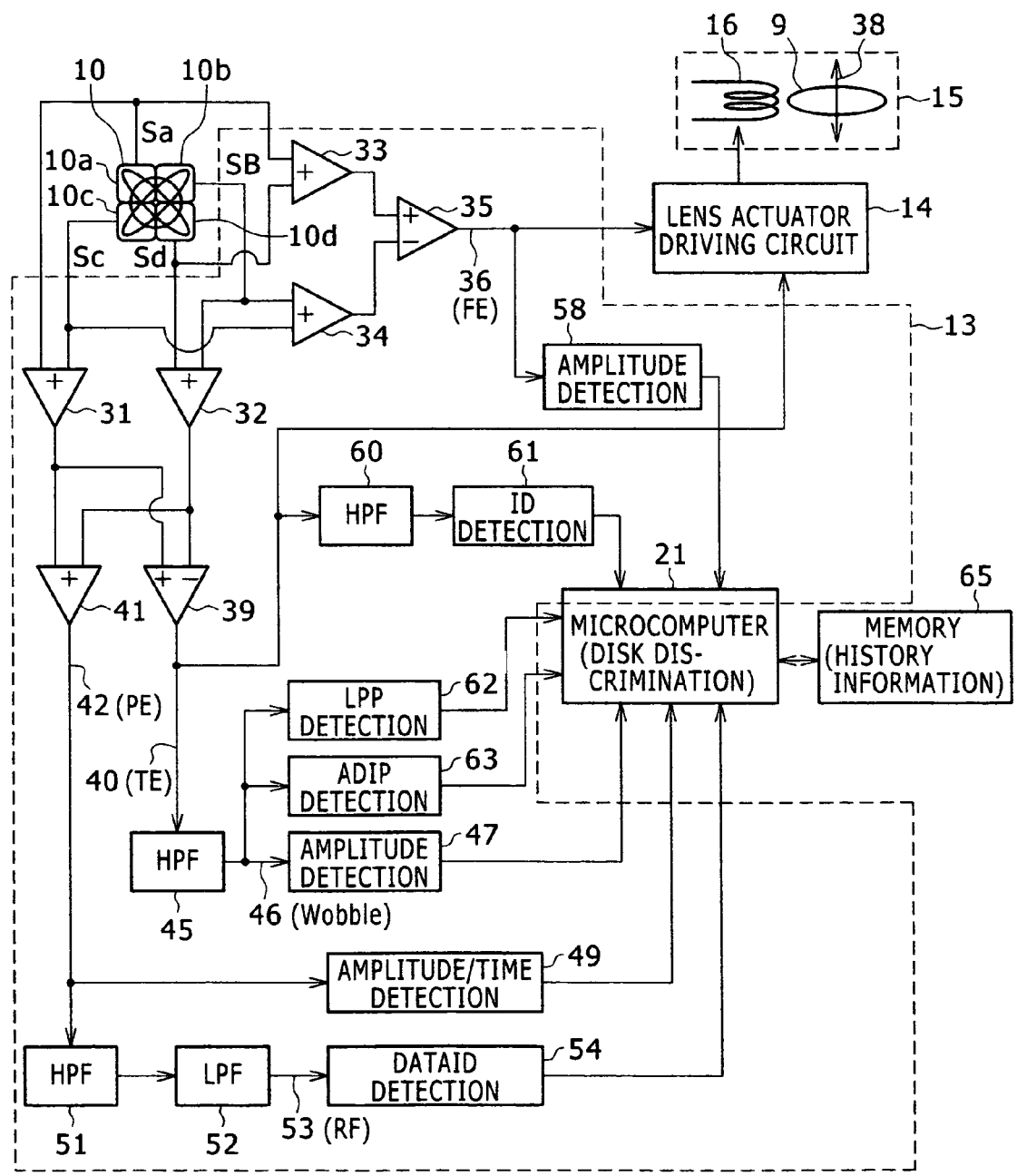
FIG. 8 is a block configuration diagram showing an embodiment of a signal processing circuit in the optical disk apparatus according to the present invention.

FIG. 8 is a block configuration diagram showing an embodiment of the signal processing circuit 13 in the optical disk apparatus according to the present invention. The signal processing circuit 13 receives a detection signal from the quad detector 10 to discriminate the kind of loaded disk as well as to perform a focus/tracking control and a producing signal control.

First of all, the focus control will be described. The laser beam reaching the quad detector 10 after being reflected by the optical disk 2 is made to be astigmatic by transmitting the half mirror located in mid-course, and is converted into respective output signals Sa, Sb, Sc, and Sd by the four light receiving elements 10a, 10b, 10c, and 10d, respectively. Sa+Sc, Sb+Sd, Sa+Sd, and Sb+Sc are output by adders 31, 32, 33, and 34, respectively. The outputs of the adders 33 and 34 are input to a subtractor 35, and a focus error signal (FE signal) 36 represented by (Sa+Sd)–(Sb+Sc) is output. The FE signal 36 is input into the lens actuator driving circuit 14 to be amplified, and then is supplied to the coil 16 of the lens actuator 15 for automatic adjustment of out-of-focus by driving the focus lens 9 in the optical axis direction indicated by an arrow 38.

Next, the tracking control will be described. The outputs of the adders 31 and 32 are input to a subtractor 39, and a tracking error signal (TE signal) 40 represented by (Sa+Sc)–(Sb+Sd) is output. The TE signal 40 is input into the lens actuator driving circuit 14 to be amplified, and then is supplied to the coil 16 of the lens actuator 15 for automatic adjustment of out-of-tracking by driving the focus lens 9 in the disk-radius direction perpendicular to the arrow 38.

Further, the outputs of the adders 31 and 32 are input to an adder 41, and a total sum signal (PE signal) 42 represented by (Sa+Sb+Sc+Sd) is output. The PE signal 42 is input to the microcomputer 21, and is converted into digital information by an A/D converter to reproduce the information.

Next, the respective signals to be used for discrimination of the disk will be described. The above-described focus error signal (FE), tracking error signal (TE), and total sum signal (PE) are used for discrimination of the disk. In order to discriminate the disk in more detail, the following signals are generated.

First of all, an amplitude value of the focus error signal (FE) 36 is detected by an amplitude detecting circuit 58, and is supplied to the microcomputer 21. The tracking error signal (TE) 40 is allowed to pass through a high-frequency pass filter (HPF) 60 and an ID detecting circuit 61 to obtain address information that is unique to a DVD-RAM. Further, the TE signal 40 is allowed to pass through an HPF 45 to obtain a Wobble signal 46. The Wobble signal 46 is allowed to pass through an LPP detecting circuit 62 to obtain address information that is unique to a DVD-R/RW. Further, the Wobble signal 46 is allowed to pass through an ADIP detecting circuit 63 to obtain address information that is unique to a DVD+R/RW. Furthermore, the Wobble signal 46 is allowed to pass through an amplitude detecting circuit 47 to obtain a Wobble amplitude value, which is then supplied to the microcomputer 21. The total sum signal (PE signal) 42 is allowed to pass through an amplitude/time detecting circuit 49 to obtain an amplitude value of the PE signal and the detection timing, which are then supplied to the microcomputer 21. Further, the PE signal 42 is allowed to pass through an HPF 51 and a low-frequency pass filter (LPF) 52 to obtain an information reproducing signal (RF signal) 53. The RF signal 53 is allowed to pass through a DATAID detecting circuit 54 to obtain address information that is unique to a DVD-ROM and the like (a recording area of a DVD-ROM and a DVD+R/RW).

Figure 9:
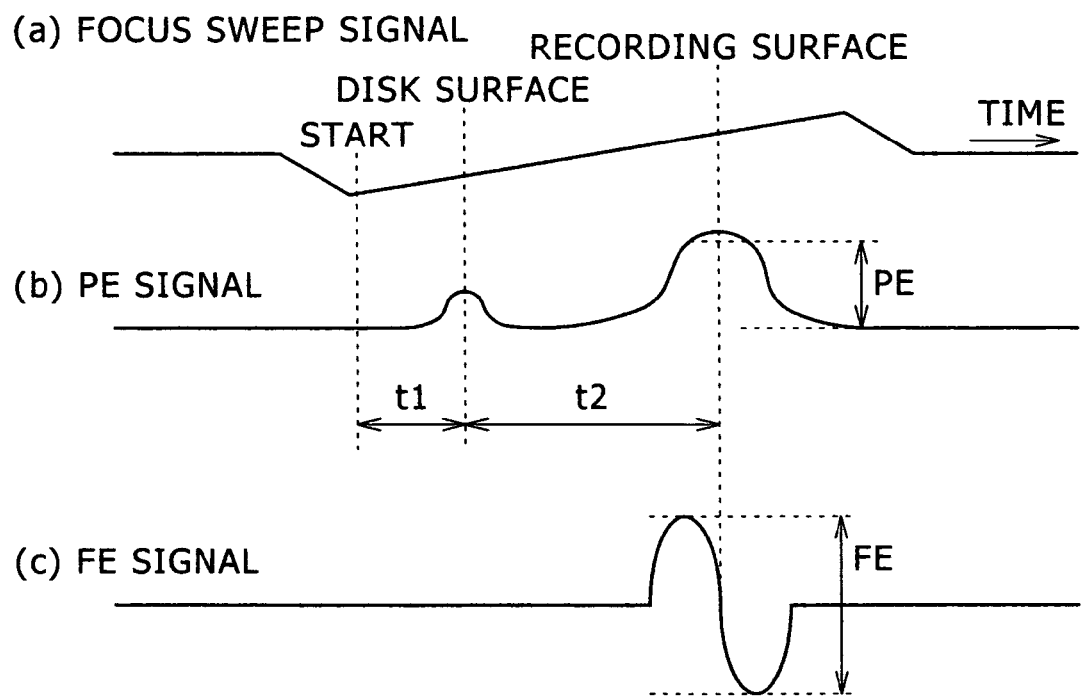
FIG. 9 is a diagram explaining an example of a disk discriminating method in the embodiment.

FIG. 9 is a diagram for explaining an example of a disk discrimination method according to the embodiment. Here, as one of the discrimination methods, a method of measuring the position of the recording surface of the disk (distance from the surface) is presented, and the above-described total sum signal (PE) and focus error signal (FE) are utilized.

Laser light with the corresponding wavelength in accordance with the kind of disk to be discriminated is emitted, and the focus of the laser beam is moved (focus sweep) to the recording surface from the surface of the disk as shown in (a). The PE signal (b) and the FE signal (c) which can be obtained at this time are measured. In the focus sweep, the lens actuator 15 is driven by the lens actuator driving circuit 14, and the amplitudes of the PE signal and the FE signal are detected by the amplitude/time detecting circuit 49 and the amplitude detecting circuit 58, respectively.

First of all, at the time when a time t1 elapses since the beginning of the focus sweep, a small peak of the PE signal is detected on the disk surface. At the time when a time t2 elapses after further focus sweep, a large peak of the PE signal and a large amplitude of the FE signal are detected in the vicinity of the recording surface. Especially in the FE signal, a zero-cross point is found at the position of the recording surface. A distance from the disk surface to the recording surface can be obtained by measuring the elapsed time t2 from the detection of the reflected light from the disk surface to the zero-cross point of the FE signal on the disk recording surface. By utilizing the fact that a distance from the disk surface to the recording surface differs depending on the kind of disk, thresholds are set for discrimination of the disk. That is, a threshold T_BD of the elapsed time for discrimination of a BD having a distance d=about 0.1 mm from the disk surface to the recording surface and a threshold T_DVD of the elapsed time for discrimination of a DVD having a distance d=about 0.6 mm from the disk surface to the recording surface are set (T_BD<T_DVD), and the disk discrimination is performed by comparing the obtained t2 with these thresholds. The microcomputer 21 stores these thresholds for comparison and discrimination.

The discrimination method of the embodiment is characterized in by which sequence the kind of disk is discriminated. That is, the discrimination was conventionally performed in accordance with the predetermined sequence of the kinds of disks. For example, the discrimination of a BD having a shallow depth of the recording layer was performed first, and then the discrimination of a DVD was performed unless the result of the discrimination was a BD. On the contrary, in the embodiment, the sequence of discrimination is not fixed, but is adaptively switched with reference to history information of the disks that were loaded in the past. As a parameter for determining the sequence of discrimination in the embodiment, there is used "BD preference flag" which indicates whether the discrimination is started from a BD disk. The explanation of the fag will be made below.

Figure 10:
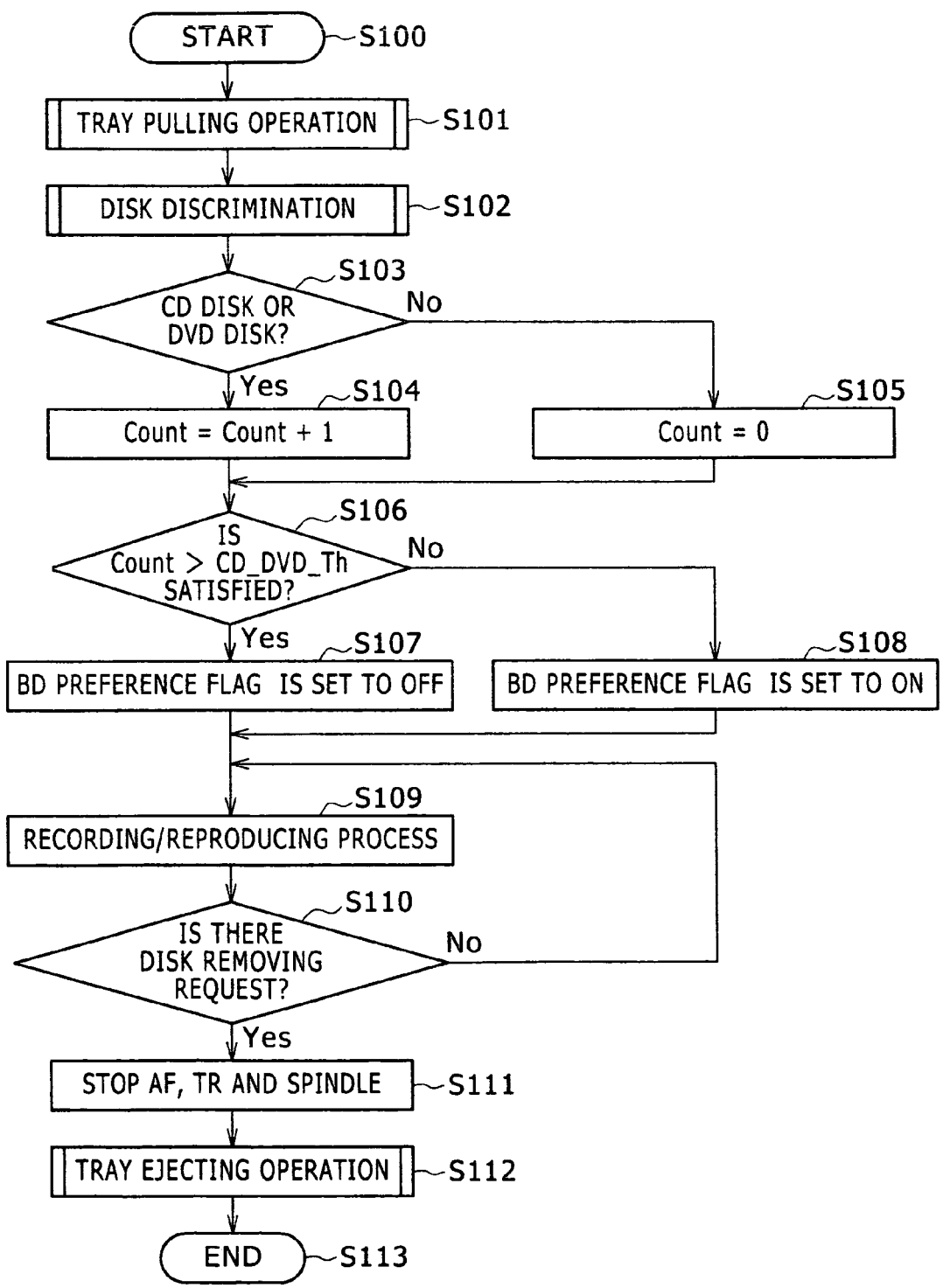
FIG. 10 is a flowchart showing procedures of setting a BD preference flag in the embodiment.

FIG. 10 is a flowchart showing procedures of setting the BD preference flag. A disk is loaded to perform the tray pulling operation (S101), and the kind of disk is discriminated (S102). It is determined whether the disk is a CD or a DVD (S103), and if the disk is a CD or a DVD, 1 is added to the value of "CD/DVD continuous counter" (hereinafter, referred to as Count) (S104). If the disk is one other than a CD or a DVD (a BD in this case), the Count value is reset to 0 (S105). Then, the Count value is compared with the specified value (CD_DVD_Th) (S106). If the Count value exceeds the specified value (CD_DVD_Th), the BD preference flag is set to OFF (S107). If the Count value does not exceed the specified value, the BD preference flag is set to ON (S108). Then, after the process of recording/reproducing, the disk is ejected (S112), and the flow ends (S113).

In short, "CD/DVD continuous counter" stores information on how many times a CD or a DVD has continuously been loaded into the apparatus to date. If the continuous number of times exceeds a specified number of times, the BD preference flag is set to OFF. The history information of the Count value and the BD preference flag is stored in a nonvolatile memory 65 of the microcomputer 21, and is utilized for switching the sequence of determination when a new disk is loaded.

FIG. 11 to FIG. 14 are flowcharts showing a series of procedures of the disk discrimination in the embodiment.

Figure 11:
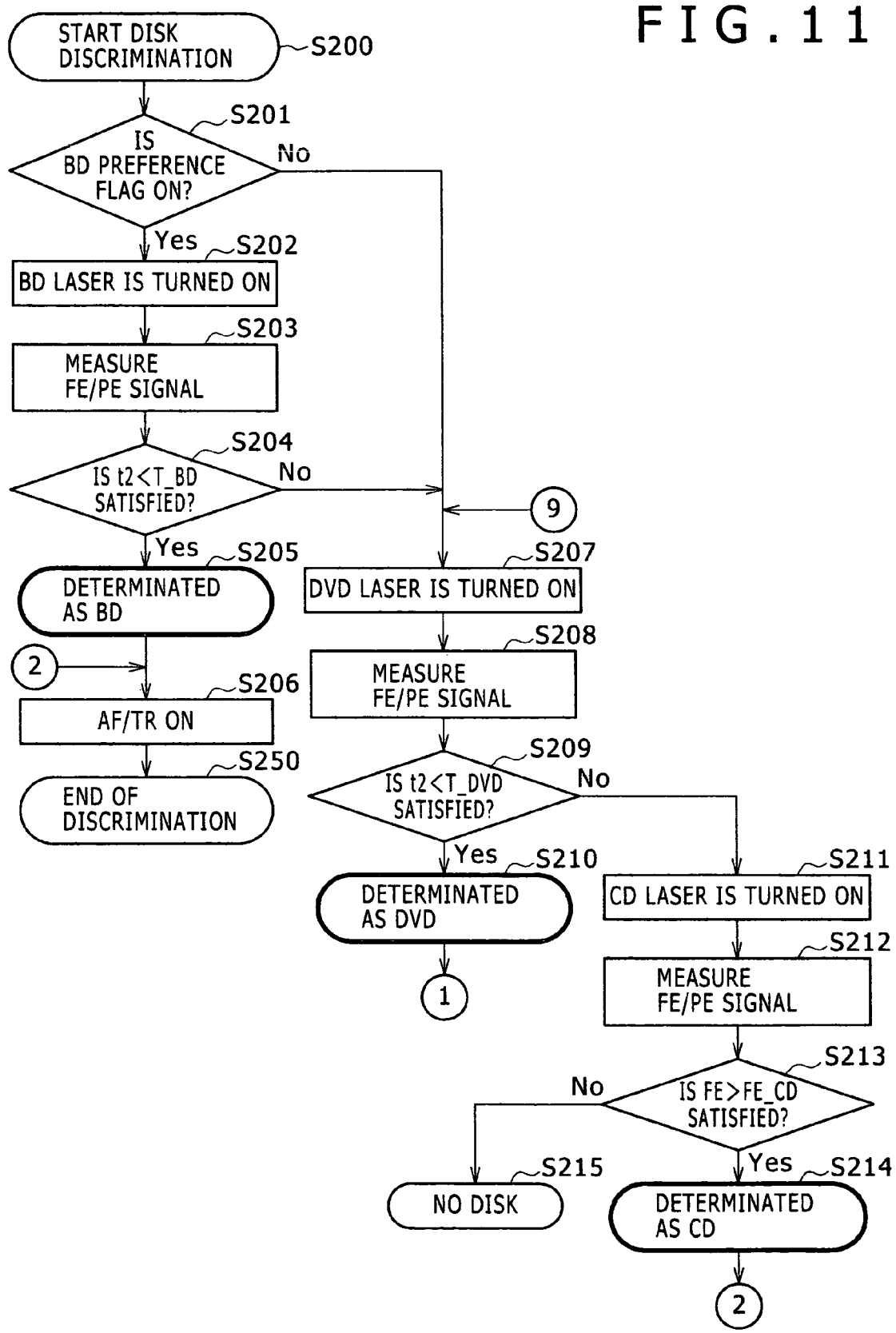
FIG. 11 is a flowchart showing a series of procedures of discriminating a disk in the embodiment.

FIG. 11 shows a first step of the discrimination process in which the discrimination is performed by turning on a BD laser or a DVD laser first in accordance with the BD preference flag. If the BD preference flag is ON ("Yes" route from S201), the BD laser is started to turn on (S202), and the FE signal and the PE signal are measured by the focus sweep (S203). The elapsed time t2 to reach the recording surface from the disk surface is obtained from these signals, and is compared with the predetermined threshold T_BD (S204). If t2<T_BD is satisfied, the disk is determined as a BD (S205), an auto focus and a tracking control is made ON (S206), and the discrimination ends (S250).

If t2≧T_BD is satisfied in S204, the DVD laser is turned on next (S207), and the FE signal and the PE signal are measured (S208). The elapsed time t2 to reach the recording surface is obtained, and is compared with the predetermined threshold T_DVD (S209). If t2<T_DVD is satisfied, the disk is determined as a DVD (S210). If the disk is a DVD, the disk is further discriminated by further classifying in detail (DVD±R, ±RW, ROM and RAM) as shown in FIG. 12 to FIG. 14 that follow.

If t2≧T_DVD is satisfied in S209, a CD laser is turned on next (S211), and the FE signal and the PE signal are measured (S212). The FE amplitude is compared with a threshold FE_CD (S213). If FE>FE_CD is satisfied, the disk is determined as a CD (S214). If FE≦FE_CD is satisfied in S213, it is determined as no-disk (S215).

On the other hand, if the BD preference flag is OFF in S201, the flow proceeds to S207 from which the DVD laser is started to turn on to perform the same discrimination as described above. In this case, even if t2<T_DVD is satisfied in S209, the disk cannot be identified as a DVD (there is a possibility that the disk is a BD). For this case, the discrimination is continued in FIG. 12 to FIG. 14.

Figure 12:
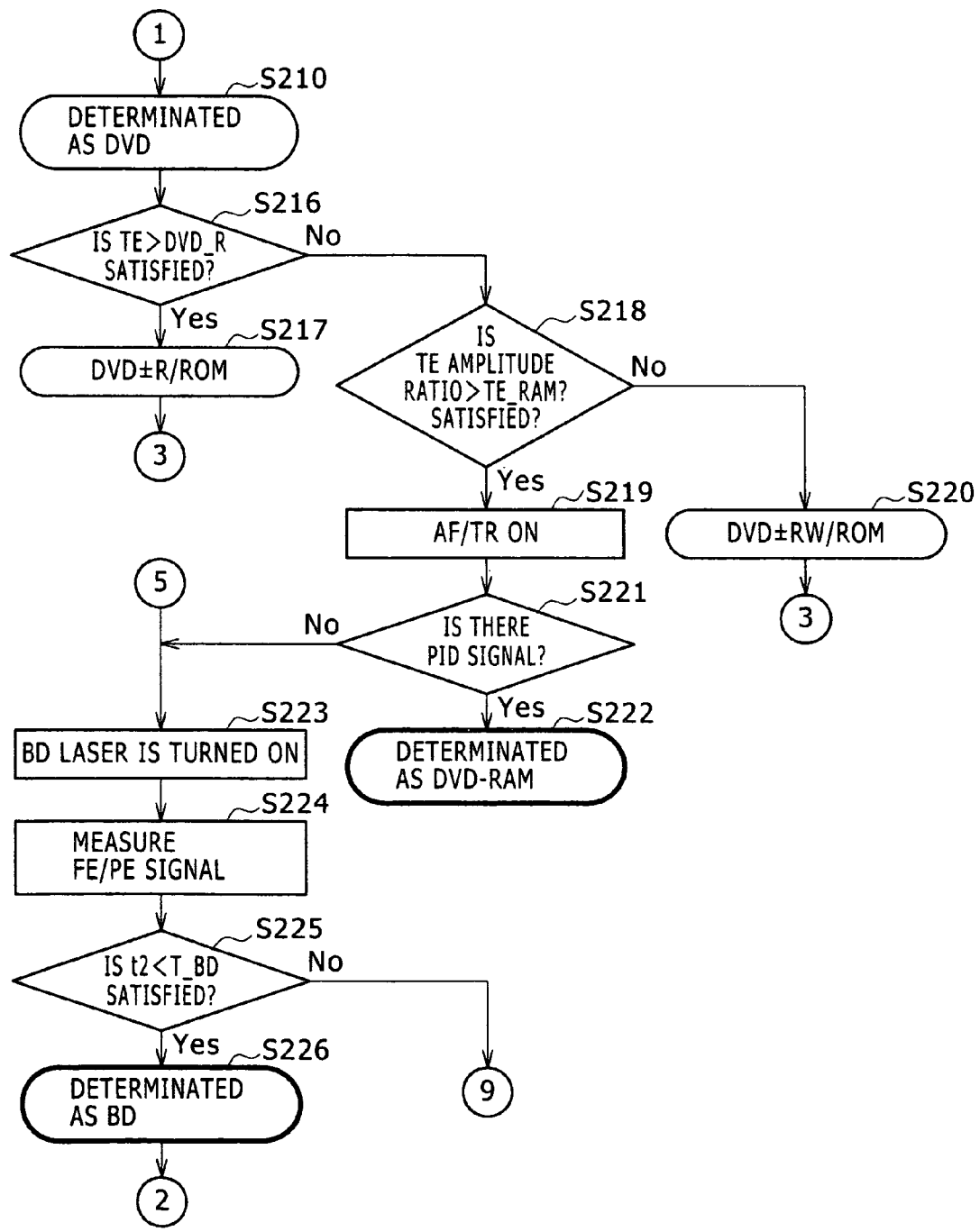
FIG. 12 is a flowchart showing a series of procedures of discriminating a disk in the embodiment.
Figure 13:
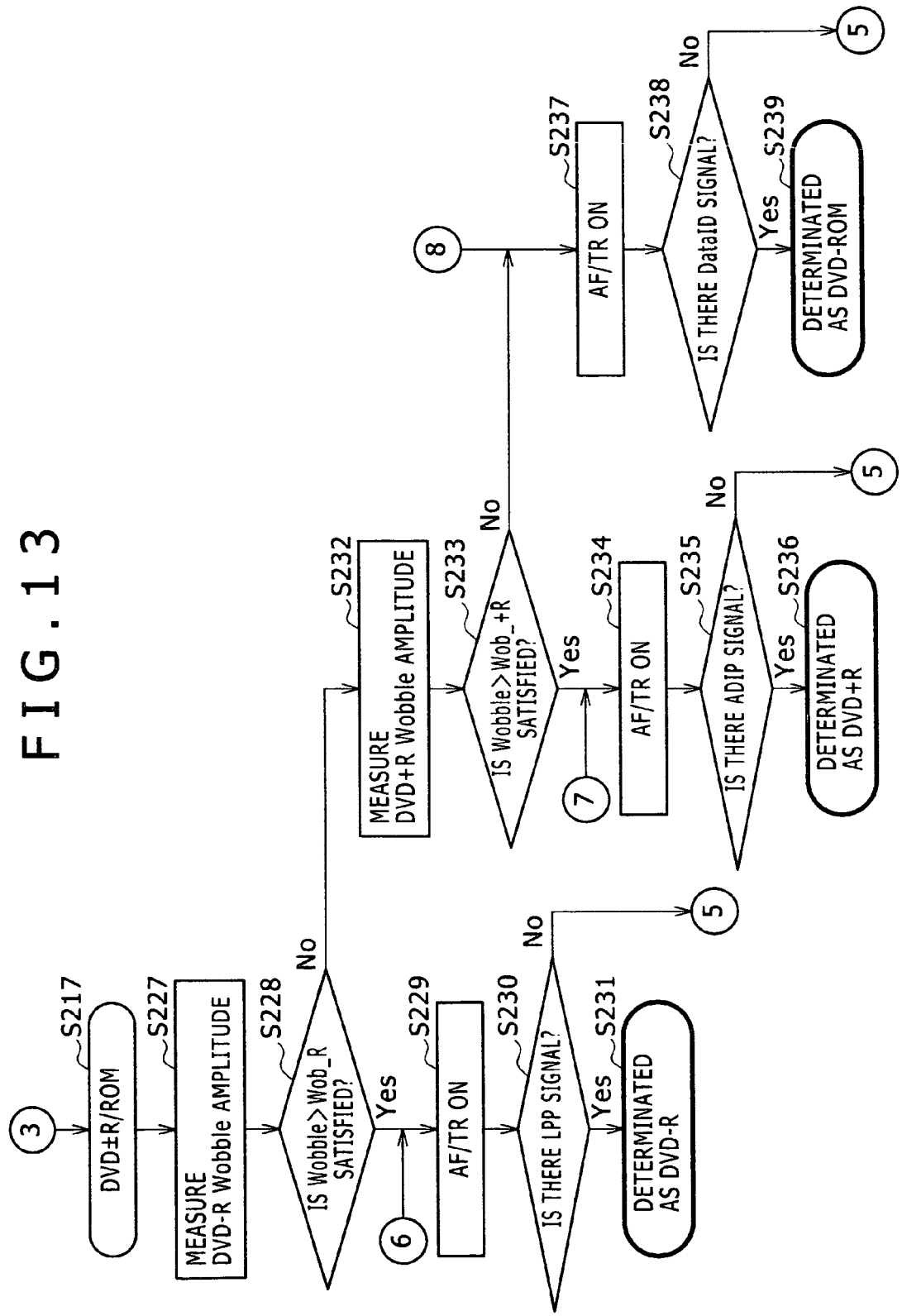
FIG. 13 is a flowchart showing a series of procedures of discriminating a disk in the embodiment.
Figure 14:
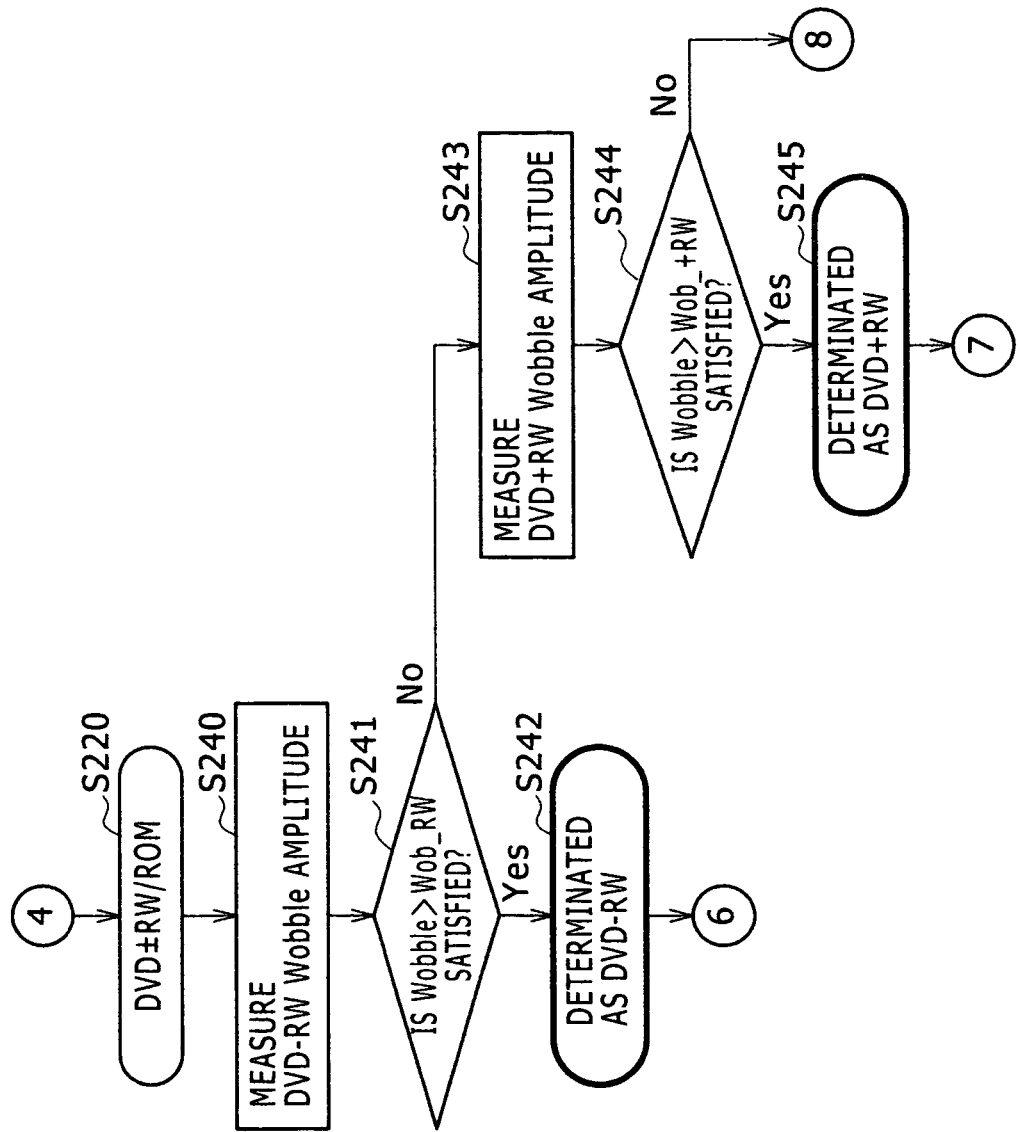
FIG. 14 is a flowchart showing a series of procedures of discriminating a disk in the embodiment.

FIG. 12 to FIG. 14 show the discrimination process of a second step that follows S210 of FIG. 11, and show a case in which the DVD is discriminated by further classifying in detail, or the discrimination is performed by switching from the DVD laser to the BD laser depending on conditions.

In the case where the disk is determined as a DVD in S210, if a PID signal unique to a DVD can be further detected, the DVD is determined as a DVD-RAM (S222). If an LPP signal can be detected, the DVD is determined as a DVD-R (S231). If an ADIP signal can be detected, the DVD is determined as a DVD+R (S236). If DataID can be detected, the DVD is determined as a DVD-ROM (S239). Further, if the Wobble amplitude is larger than a threshold Wob_RW, the DVD is determined as a DVD-RW (S242). If the Wobble amplitude is larger than a threshold Wob_+RW, the DVD is determined as a DVD+RW (S245).

If none of the signals (PID, LPP, ADIP, DataID) unique to a DVD can be detected, the flow proceeds to S223 where the BD laser is instead turned on. If the elapsed time t2 to reach the recording surface is smaller than a threshold T_BD, the disk is determined as a BD (S226).

In the embodiment, which comes first between BD and DVD in the sequence of the disk discrimination is switched in accordance with the BD preference flag. Since the history of the kinds of disks that have been loaded to date is reflected in the BD preference flag, the kind of disk that is loaded next can be anticipated by utilizing the history. That is, the discrimination is performed starting from the kind of disk that would be loaded with high probability, and therefore there is an advantage that the time required until the end of the discrimination can be shortened.

According to the embodiment, the kind of disk to be loaded next is anticipated by focusing on the number of times a CD or a DVD was continuously loaded in the past. However, it is obviously possible to anticipate the kind of disk to be loaded next by focusing on the number of times a disk of another specific kind (for example, a BD) was continuously loaded. Further, it will be obvious that any index can be available if it indicates a frequency (ratio) of loading in the past, without limiting to the continuous number of times of loading.

The first embodiment is directed to the beam-expander operation whereas the second embodiment is directed to the sequence of the disk discrimination. Even each embodiment or even a combination of the embodiments largely contributes to shortening of the starting time. In the case where the embodiments are combined, it will be obvious that the adjustment of the movable lens of the beam-expander in the first embodiment is performed in accordance with the kind of disk that is discriminated first in the second embodiment. According to the embodiments, in the three-wavelength-compliant optical disk apparatus, the kind of loaded optical disk is discriminated, the starting time for adjusting the beam-expander is shortened, and user-friendliness can be improved.

While we have shown and described several embodiments in accordance with our invention, it should be understood that disclosed embodiments are susceptible to changes and modifications without departing from the scope of the invention. Therefore, we do not intend to bound by the details shown and described herein but intend to cover all such changes and modifications as fall within the ambit of the appended claims.

What is claimed is:

1. An optical disk apparatus into which a plurality of kinds of optical disks can be loaded, comprising:
    a beam-expander for adjusting the focus of a laser beam applied on an optical disk, comprising a movable lens and another lens;
    a tray driver which pulls a loaded optical disk of one of the kinds within the apparatus;
    a beam-expander driver which drives movement of the movable lens of the beam-expander relative to the other lens of the beam-expander; and
    a controller which controls the tray driver and the beam-expander driver,
    wherein when the tray driver pulls the loaded optical disk within the apparatus, the controller adjusts the beam-expander by moving the movable lens to a predetermined position in accordance with the one kind of the loaded optical disk in parallel with the pulling operation.

2. The optical disk apparatus according to claim 1, wherein when the tray driver ejects the loaded optical disk, the controller allows the beam-expander driver to move the movable lens to a reference position.

3. The optical disk apparatus according to claim 1, further comprising:
    a signal processor which processes a signal detected from the loaded optical disk;

a disk-discriminator which discriminates the kind of optical disk based on an output signal from the signal processor; and a storing unit which stores history information indicating a frequency of the kind of optical disk that was loaded into the apparatus in the past, wherein:

when the kind of newly-loaded optical disk is discriminated, the disk-discriminator switches a sequence of discriminating the kind of optical disk by referring to the history information stored in the storing unit, and the beam-expander driver allows the movable lens of the beam-expander to move in accordance with the kind of optical disk which is discriminated first by the disk-discriminator.

4. The optical disk apparatus according to claim 3, wherein:

the history information stored in the storing unit includes the number of times an optical disk of a specific kind has continuously been loaded to date, and the disk-discriminator performs discrimination starting with the optical disk of the specific kind when the number of times of loading exceeds a specific number of times.

5. The optical disk apparatus according to claim 3, wherein:

the signal processor sweeps a laser beam applied on the optical disk in the disk-thickness direction so as to measure required time to reach a recording surface from a disk surface, and the disk-discriminator discriminates the kind of optical disk by comparing the required time with a predetermined threshold.

6. A method of starting an optical disk apparatus into which a plurality of kinds of optical disks can be loaded and which includes a beam-expander for adjusting the focus of a laser beam applied on an optical disk, the method comprising the steps of:

pulling a loaded optical disk of one of the kinds within the apparatus; and adjusting the beam-expander by moving a movable lens of the beam-expander to a predetermined position relative to another lens of the beam-expander, in accordance with the one kind of the loaded optical disk, wherein the two steps are performed in parallel.

7. The method of starting an optical disk apparatus according to claim 6, further comprising the step of ejecting the loaded optical disk from inside the apparatus, wherein when the loaded optical disk is ejected, the movable lens of the beam-expander is moved to the reference position.

8. The method of starting an optical disk apparatus according to claim 6, further comprising the step of discriminating the kind of loaded optical disk, wherein:

history information indicating a frequency of the kind of optical disk that was loaded into the apparatus in the past is stored, when the kind of newly-loaded optical disk is discriminated, a sequence of discriminating the kind of optical disk is switched by referring to the history information, and the movable lens of the beam-expander is moved in accordance with the kind of optical disk which is discriminated first.

9. The method of starting an optical disk apparatus according to claim 8, wherein:

the history information to be stored includes the number of times an optical disk of a specific kind has continuously been loaded to date, and in the step of discriminating the kind of optical disk, the discrimination is performed starting with the optical disk of the specific kind when the number of times of loading exceeds a specific number of times.

10. The method of starting an optical disk apparatus according to claim 8, wherein in the step of discriminating the kind of optical disk, a laser beam applied on the loaded optical disk is swept in the disk-thickness direction so as to measure required time to reach a recording surface from a disk surface, and the kind of optical disk is discriminated by comparing the required time with a predetermined threshold.

* * * * *